United States Patent
Bonanno

(10) Patent No.: US 10,260,644 B2
(45) Date of Patent: Apr. 16, 2019

(54) VALVE

(71) Applicant: CONTINENTAL AUTOMOTIVE GmbH, Hannover (DE)

(72) Inventor: Rosario Bonanno, Bad Soden (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/538,141

(22) PCT Filed: Dec. 15, 2015

(86) PCT No.: PCT/EP2015/079793
§ 371 (c)(1),
(2) Date: Jun. 20, 2017

(87) PCT Pub. No.: WO2016/102242
PCT Pub. Date: Jun. 30, 2016

(65) Prior Publication Data
US 2018/0003306 A1    Jan. 4, 2018

(30) Foreign Application Priority Data
Dec. 22, 2014 (DE) ........................ 10 2014 226 885

(51) Int. Cl.
*F16K 31/06* (2006.01)
*F16K 7/16* (2006.01)
*F02B 37/16* (2006.01)
*F16K 1/48* (2006.01)

(52) U.S. Cl.
CPC ............... *F16K 7/16* (2013.01); *F02B 37/16* (2013.01); *F16K 1/485* (2013.01); *F16K 31/0655* (2013.01); *F16K 31/0672* (2013.01); *Y02T 10/144* (2013.01)

(58) Field of Classification Search
CPC ..... F16K 31/0672; F16K 31/0655; F16K 7/14
USPC ..................................................... 251/129.17
See application file for complete search history.

(56) References Cited

U.S. PATENT DOCUMENTS

| | | | | |
|---|---|---|---|---|
| 3,420,492 | A * | 1/1969 | Ray ................... | F16K 31/082 251/129.17 |
| 4,932,430 | A * | 6/1990 | Fernstrom ............ | F23N 1/007 137/85 |
| 4,953,825 | A * | 9/1990 | Osumi ............... | F16K 31/0658 251/129.07 |
| 5,469,886 | A * | 11/1995 | Noya ................. | F02M 25/0836 123/520 |
| 6,000,677 | A * | 12/1999 | Cook ................. | F16K 31/0696 251/129.07 |
| 6,216,673 | B1 * | 4/2001 | Matsumoto ........ | F02M 25/0836 123/520 |

(Continued)

FOREIGN PATENT DOCUMENTS

| | | |
|---|---|---|
| CN | 2438890 | 7/2001 |
| CN | 102052480 | 5/2011 |

(Continued)

*Primary Examiner* — Matthew W Jellett
(74) *Attorney, Agent, or Firm* — Cozen O'Connor

(57) ABSTRACT

A valve comprising a housing, a solenoid in the housing, a pin that can be moved by the solenoid, and a cup-shaped piston connected to the pin. The piston has an injection-molded membrane as a base, and the pin is connected to the membrane. The valve further includes a spring that rests against the membrane. The membrane is riveted to the pin.

8 Claims, 3 Drawing Sheets

(56) References Cited

U.S. PATENT DOCUMENTS

| | | | | |
|---|---|---|---|---|
| 7,249,749 B2* | 7/2007 | Niwa | ............... | F16K 31/0655 |
| | | | | 251/129.16 |
| 8,308,130 B2* | 11/2012 | Vaz De Azevedo | ..................... | |
| | | | | F16K 31/0693 |
| | | | | 251/129.07 |
| 2003/0197143 A1* | 10/2003 | Kai | ................ | F02M 25/0836 |
| | | | | 251/129.17 |
| 2005/0279956 A1* | 12/2005 | Berger | .................. | F16K 1/44 |
| | | | | 251/77 |
| 2008/0203344 A1* | 8/2008 | Cobb | ................. | F02M 17/04 |
| | | | | 251/129.17 |
| 2016/0178082 A1 | 6/2016 | Bonanno | | |

FOREIGN PATENT DOCUMENTS

| | | |
|---|---|---|
| DE | 10 2012 224 130 | 6/2014 |
| DE | 10 2013 214 594 | 1/2015 |
| DE | 102013214594 | 1/2015 |
| FR | 2 460 436 | 1/1981 |
| FR | 2 765 267 | 12/1998 |
| JP | S 53-120701 | 10/1978 |
| JP | S 55-36984 | 3/1980 |
| JP | 2000-170948 | 6/2000 |
| WO | WO 2007/048828 | 5/2007 |
| WO | WO 2014/095402 | 6/2014 |
| WO | WO 2014/095509 | 6/2014 |

\* cited by examiner

VALVE

CROSS REFERENCE TO THE RELATED APPLICATION

This is a U.S. national stage of application No. PCT/EP2015/079793, filed on Dec. 15, 2015. Priority is claimed on German, Application No. DE102014226885.0, filed Dec. 22, 2014, the content of which is incorporated here by reference.

BACKGROUND OF THE INVENTION

1. Field of the Invention

The invention relates to a valve having a housing, a solenoid arranged in the housing a pin that can be moved by the solenoid, and a pot-shaped piston connected to the pin, wherein the piston has an injection-molded diaphragm as a base and the pin is connected to the diaphragm, and a spring that bears against the diaphragm.

2. Description of the Related Art

Valves are used inter alia as an overrun air recirculation valve on the turbocharger in motor vehicles to open up a bypass to the intake side during overrun operation, and are therefore known. To prevent excessive braking of the turbocharger and to ensure a rapid start-up, rapid opening and closing of the valve is an essential prerequisite. During the closing process in particular, an important aspect is the immediate closure by way of the placement of the piston on a valve seat. The valve seat is formed by the housing of the turbocharger, on which housing the valve is flange-mounted. As a consequence, the valve seat is not completely parallel to the piston, which would be necessary for rapid and above all tight closing. In order to ensure a secure closing process, the piston has to adapt to the valve seat. For this purpose, it is known to connect the pin to the diaphragm of the piston. It is known from DE 10 2013 214 594 A to arrange a sleeve in the center of the diaphragm to anchor the pin. The sleeve is pressed on or welded to the diaphragm. A disadvantage here is that the fastening of the sleeve to the diaphragm leads to weakening of the diaphragm, in particular with regard to the long-term stability of the connection. Furthermore, the diaphragm is stressed by the spring, which spring generates the closing force, especially due to lateral relative movements of the spring.

SUMMARY OF THE INVENTION

One aspect of the invention is based on the object of providing a valve with improved long-term stability and is achieved in that the diaphragm is riveted to the pin.

During the riveting process, the diaphragm is fixed between the rivet head and the pin, and thus a joint that is intimate and has long-term stability is provided, since no weakening of the diaphragm takes place.

In an advantageous refinement, the long-term stability of the diaphragm is further increased if the diaphragm has elements for guiding the spring.

In the simplest case, the guide element is a circumferential bead on which the spring is centered. As a result of the centering, movement of the spring relative to the diaphragm, and thus damage to the diaphragm, is avoided.

Such centering of the spring can be achieved according to another advantageous refinement in that the guide elements are at least two beads that are spaced apart from one another. The advantage is that the bead length can be smaller.

Good centering is achieved if the beads are arranged in a star shape.

In another refinement, the beads are arranged such that they lie on a diameter.

A further advantageous refinement involves forming the diaphragm so as to be adaptable specifically to the load and flowing media, if the diaphragm is composed of plastic or metal.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
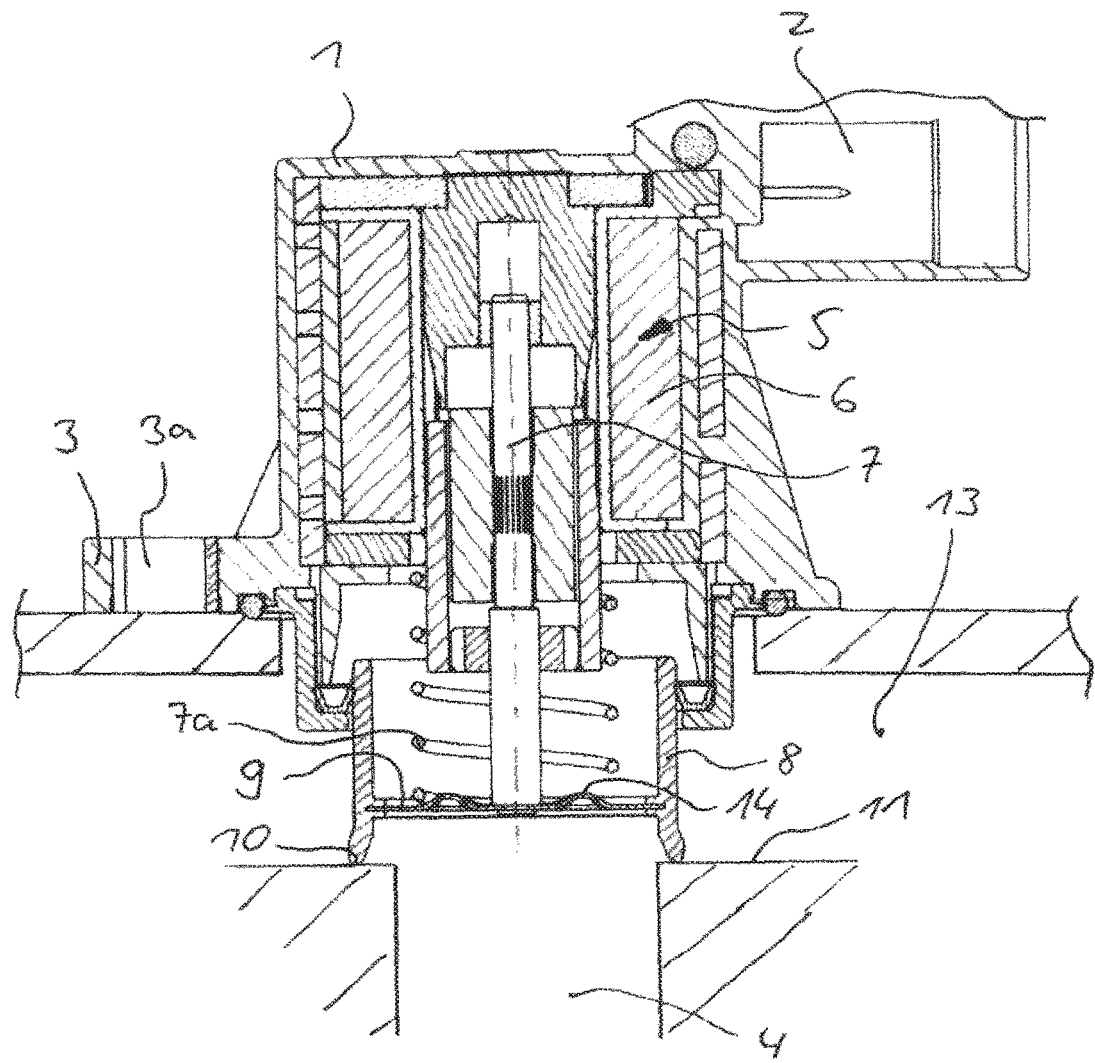
FIG. 1 is a sectional illustration of the valve according to the invention.

FIG. 1 shows the valve, comprising a housing 1 having an integrally formed connector 2 for the electrical connection of the valve. The housing 1 further has an integrally formed flange 3 and three bores 3a via which the housing 1 is flange-mounted on a turbocharger (not shown) in the region of the bypass line 4. A solenoid 5 having a coil 6 and a metal pin 7 is arranged in the housing 1. The metal pin 7 is connected to a pot-shaped piston 8 composed of plastic and has an axially projecting annular sealing surface 10 on the circumference of its base 9. In the closed position shown, the sealing surface 10 bears against the valve seat 11 in order to close off the bypass line 4, so that no medium can flow from the line 4 into the line 13. Here, a spring 7a pushes the piston 8 in the direction of the valve seat 11. The base 9 is a plastic diaphragm which is arranged in the piston 8 by way of insert molding. The diaphragm 9 has a circumferential bead 14 on which the spring 7a is centered.

Figure 2:
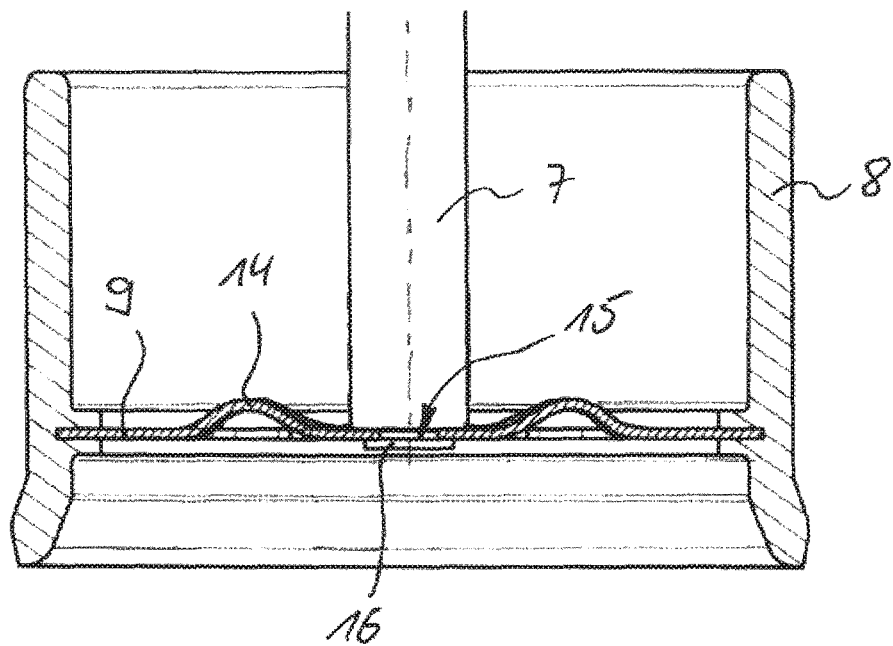
FIG. 2 is an enlarged illustration of the rivet connection.

FIG. 2 shows the connection of the pin 7 to the diaphragm 9. For this purpose, a rivet 15 is introduced into the pin 7 such that the diaphragm 9 is clamped between the pin 7 and the rivet head 16.

Figure 3:
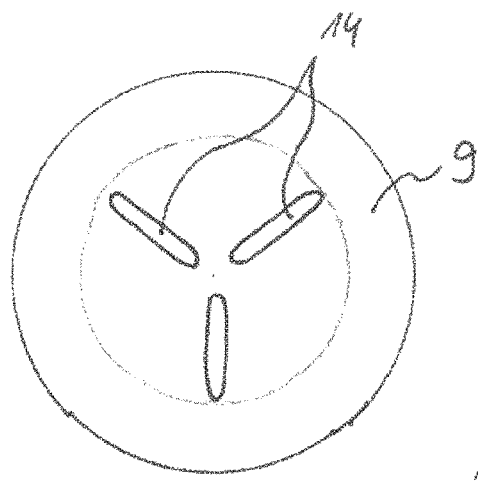
FIGS. 3-5 are further embodiments of the diaphragm.
Figure 4:
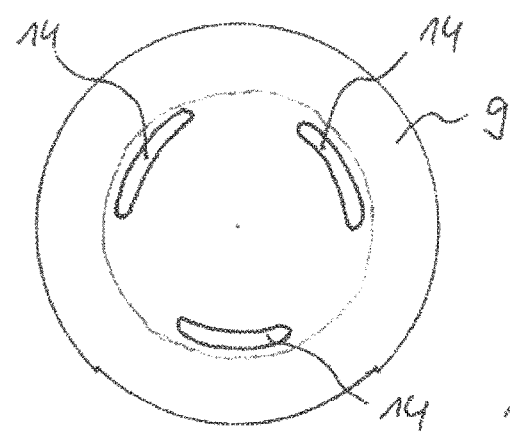
Figure 5:
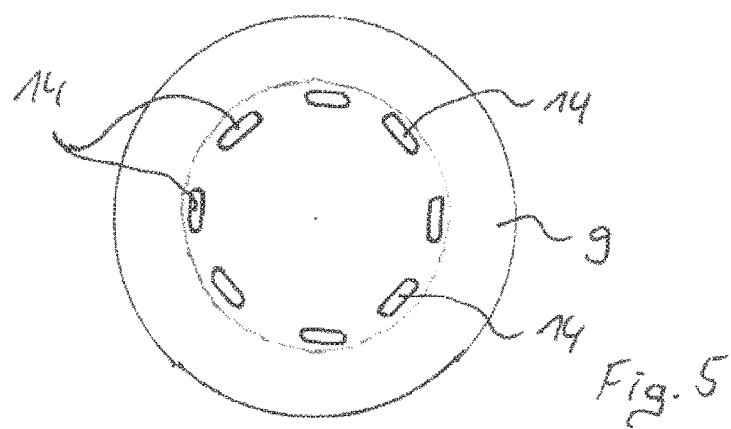

FIG. 3 shows the diaphragm 9 with three beads 14 arranged in a star shape, wherein the spring is centered radially on the outside of the beads 14. FIG. 4 shows three beads 14 arranged symmetrically on a diameter and are of arc-shaped design, while in FIG. 5, eight straight beads 14 arranged analogously to FIG. 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing;
a solenoid arranged in the housing;
a pin configured to be moved by the solenoid;
a pot-shaped piston coaxially arranged around the pin;
an injection-molded diaphragm configured as a base of the pot-shaped piston and coupled to the pin;
a spring arranged coaxially with respect to the pin that bears against the injection-molded diaphragm;
an annular sealing surface axially projecting from the injection-molded diaphragm opposite the pot-shaped piston; and
a rivet that connects the injection-molded diaphragm to the pin.

2. The valve as claimed in claim 1, wherein the injection-molded diaphragm has guide elements for guiding the spring.

3. The valve as claimed in claim 2, wherein the guide elements are a circumferential bead.

4. A valve, comprising:
a housing;
a solenoid arranged in the housing;
a pin configured to be moved by the solenoid;
a pot-shaped piston coupled to the pin;
a diaphragm configured as a base of the pot-shaped piston;
a spring that bears against the diaphragm; and
a rivet that connects the diaphragm to the pin,
wherein the diaphragm has guide elements for guiding the spring,
wherein the guide elements are at least two beads that are spaced apart from one another.

5. The valve as claimed in claim 4, wherein the at least two beads are arranged in a star shape.

6. The valve as claimed in claim 4, wherein the at least two beads are arranged such that they lie on a diameter.

7. The valve as claimed in claim 1, wherein the injection-molded diaphragm is composed of plastic or metal.

8. The valve as claimed in claim 4, wherein the diaphragm is injection-molded.

* * * * *